US012160175B2

(12) United States Patent
    Bernardon

(10) Patent No.: US 12,160,175 B2
(45) Date of Patent: Dec. 3, 2024

(54) VOLTAGE CONVERTER WITH SWITCH CONTROL CIRCUITRY

(71) Applicant: Infineon Technologies Austria AG, Villach (AT)

(72) Inventor: Derek Bernardon, Villach (AT)

(73) Assignee: INFINEON TECHNOLOGIES AUSTRIA AG, Villach (AT)

(*) Notice: Subject to any disclaimer, the term of this patent is extended or adjusted under 35 U.S.C. 154(b) by 244 days.

(21) Appl. No.: 17/831,493

(22) Filed: Jun. 3, 2022

(65) Prior Publication Data
US 2023/0396174 A1    Dec. 7, 2023

(51) Int. Cl.
    H02M 3/335    (2006.01)
    H02M 1/00     (2007.01)

(52) U.S. Cl.
    CPC ..... *H02M 3/33569* (2013.01); *H02M 1/0058* (2021.05)

(58) Field of Classification Search
    CPC ................ H02M 3/33569; H02M 1/0058
    See application file for complete search history.

(56) References Cited

U.S. PATENT DOCUMENTS

| 9,973,099 B2 * | 5/2018 | Ye .................. H02M 3/33576 |
| 10,720,913 B1 | 7/2020 | Leong et al. |
| 10,958,268 B1 | 3/2021 | Leong et al. |
| 2012/0293072 A1 * | 11/2012 | Chang ................. H05B 45/327<br>315/121 |
| 2014/0268908 A1 * | 9/2014 | Zhou .................. H02M 7/5381<br>363/37 |
| 2015/0124489 A1 * | 5/2015 | Dai ..................... H02M 3/335<br>363/17 |
| 2015/0131329 A1 * | 5/2015 | Chen ................... H02M 3/3385<br>363/17 |

(Continued)

FOREIGN PATENT DOCUMENTS

| CN | 104104231 A | * 10/2014 | ......... H02M 1/4225 |
| CN | 105191097 A | * 12/2015 | ......... H02M 3/3376 |

(Continued)

OTHER PUBLICATIONS

C. Marxgut et al.; DC-DC converter for gate power supplies with an optimal air transformer; Applied Power Electronics Conference and Exposition (APEC); 6 Pgs.; Feb. 21, 2010.

(Continued)

*Primary Examiner* — Sisay G Tiku
(74) *Attorney, Agent, or Firm* — Cooper Legal Group LLC

(57) ABSTRACT

A voltage converter is provided. The voltage converter comprises a switching circuit that includes a first pair of switches and a second pair of switches. The voltage converter comprises a transformer having a magnetizing inductance and a leakage inductance that are a function of a windings ratio of the transformer. The voltage converter comprises a capacitor coupled to the transformer and the switching circuit. The voltage converter comprises a switch control circuit configured to generate a frequency for controlling the first pair of switches and the second pair of switches. The frequency is set of a value to control the pairs of switches so that a peak capacitor voltage of the capacitor is a factor of an output voltage of the voltage converter and the windings ratio of the transformer.

19 Claims, 16 Drawing Sheets

(56) References Cited

U.S. PATENT DOCUMENTS

| | | | |
|---|---|---|---|
| 2016/0141951 A1* | 5/2016 | Mao ................... | H02M 1/36 |
| | | | 363/21.02 |
| 2019/0036446 A1* | 1/2019 | Yang ................... | H02M 1/34 |
| 2019/0260298 A1* | 8/2019 | Kominami ........ | H02M 3/33573 |
| 2020/0136521 A1* | 4/2020 | Lin ................... | H02M 3/33573 |
| 2022/0255442 A1* | 8/2022 | Morrison ............ | H02M 1/0067 |
| 2022/0388415 A1* | 12/2022 | Choi ................... | H02M 1/348 |
| 2023/0031614 A1* | 2/2023 | Choi ................. | H02M 3/33507 |

FOREIGN PATENT DOCUMENTS

| | | | | |
|---|---|---|---|---|
| CN | 115639269 A | * | 1/2023 | |
| DE | 112017001544 T5 | * | 12/2018 | .............. H02M 3/28 |
| TW | 202401966 A | * | 1/2024 | |

OTHER PUBLICATIONS

R Steiner et al.; IECON 2009—35th Annual Conference of IEEEIndustrial Electronics; Contactless energy transmission for an isolated 100W gate driver supply of a Medium Voltage Converter; Nov. 3, 2009; 6 Pgs.

Wei Yuqi et al.; Comparison among different analysis methodologies for LLC resonant converter; IET Power Electronics, IET, UK; 9 Pgs. Aug. 7, 2019.

O.H. Stielau et al.; Design of loosely coupled inductive power transfer systems; International Conference IEEE Dec. 2000; 6 Pgs.

European Search Report of Corresponding Application No. EP 23176486; Oct. 17, 2023; 10 Pgs.

* cited by examiner

VOLTAGE CONVERTER WITH SWITCH CONTROL CIRCUITRY

TECHNICAL FIELD

The present disclosure relates to the field of voltage converters.

BACKGROUND

An isolated driver, such as an isolated gate driver, can be used to transfer data and power between a primary side of the isolated driver and a secondary side of the isolated driver. A coreless transformer or other isolation device may be used to provide isolation between the primary side and the secondary side of the isolated driver. The primary side may transfer power to the secondary side, such as for controlling a power switch. The isolated driver may transfer a bias current for a supply voltage on the secondary side.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a voltage converter is provided. The voltage converter comprises a switching circuit comprising a first pair of switches and a second pair of switches. The voltage converter comprises a transformer having a magnetizing inductance and a leakage inductance that are a function of a windings ratio of the transformer. The voltage converter comprises a capacitor coupled to the transformer and the switching circuit. The voltage converter comprises a switch control circuit configured to generate a frequency for controlling the first pair of switches and the second pair of switches. The frequency is set to a value to control the first pair of switches and the second pair of switches so that a peak capacitor voltage of the capacitor is a factor of an output voltage of the voltage converter and the windings ratio of the transformer.

In an embodiment of the techniques presented herein, a voltage converter is provided. The voltage converter comprises a switching circuit comprising a first pair of switches and a second pair of switches. The voltage converter comprises a transformer having a magnetizing inductance and a leakage inductance that are a function of a windings ratio of the transformer. The voltage converter comprises a capacitor coupled to the transformer and the switching circuit. The voltage converter comprises a switch control circuit configured to generate a frequency for controlling the first pair of switches and the second pair of switches. The frequency is set to a value to control the first pair of switches and the second pair of switches so that a peak capacitor voltage of the capacitor is within a percentage margin of an output voltage of the voltage converter multiplied by the windings ratio of the transformer.

In an embodiment of the techniques presented herein, a voltage converter is provided. The voltage converter comprises a switching circuit comprising a first pair of switches and a second pair of switches. The voltage converter comprises a transformer having a magnetizing inductance and a leakage inductance that are a function of a windings ratio of the transformer. The voltage converter comprises a capacitor coupled to the transformer and the switching circuit. The voltage converter comprises a switch control circuit configured to generate a frequency for controlling the first pair of switches and the second pair of switches according to a plurality of switching events. The frequency is set to a value to control the first pair of switches and the second pair of switches so that a peak capacitor voltage of the capacitor is within a percentage margin of an output voltage of the voltage converter multiplied by the windings ratio of the transformer. Voltages across the first pair of switches and the second pair of switches is approximately zero during the plurality of switching events.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
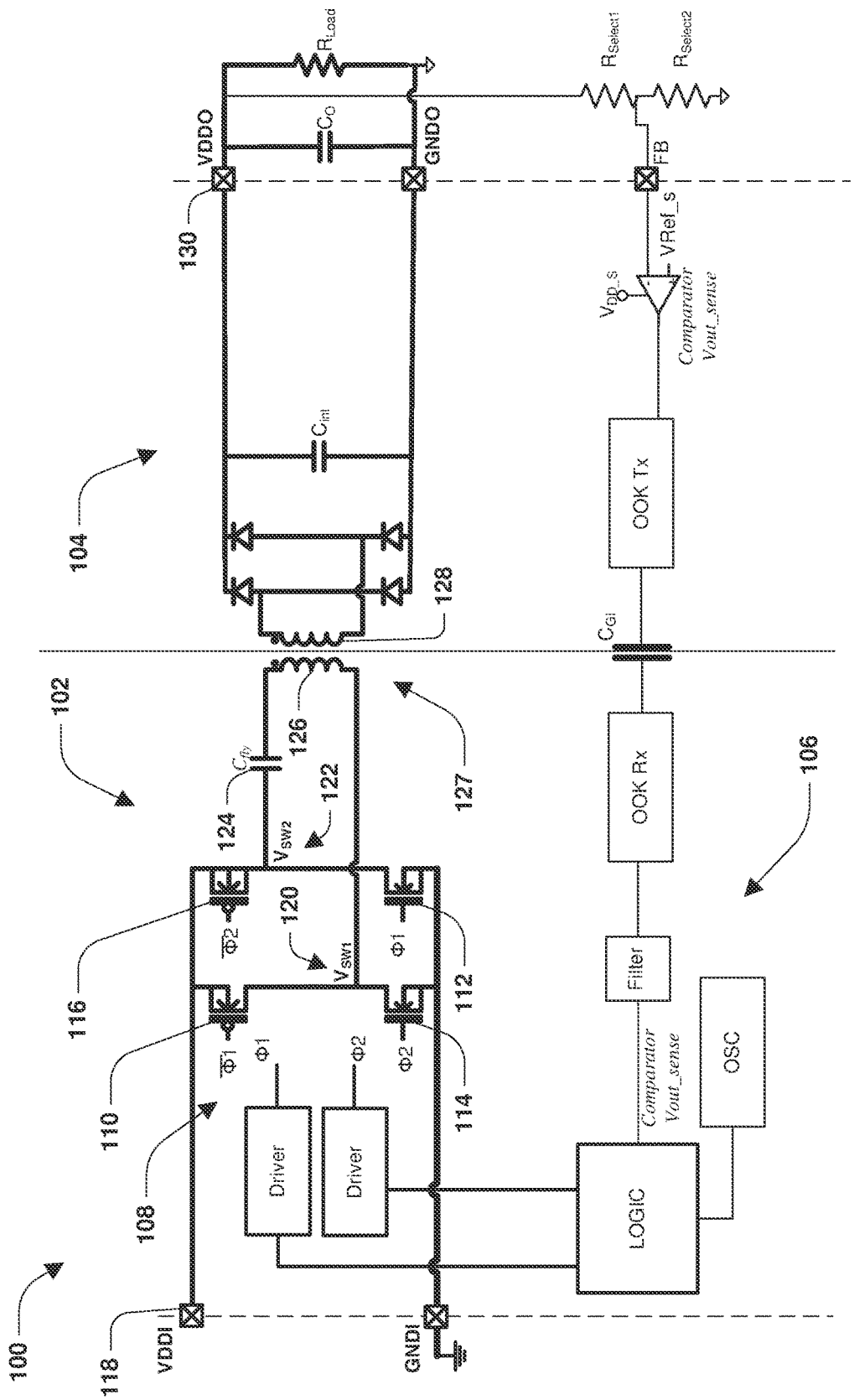
FIG. 1 is a component block diagram illustrating a voltage converter.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Voltage converters, such as an isolated gate driver, may be configured to transfer a bias current from a primary side of a voltage converter to a secondary side of the voltage converter for supplying a supply voltage on the secondary side. The supply voltage on the secondary side may have a power requirement, such as in the order 100 mW to 200 mW or any other power requirement, for example. Conventional voltage converters require additional circuitry to provide the bias current for the supply voltage at the secondary side.

In order to provide a fully integrated solution, an integrated coreless transform may be integrated into a voltage converter. Fully integrating the coreless transform into the voltage converter is challenging because coreless transforms have a low magnetizing inductance (e.g., ~80-250 nH) and a high DC resistance. In order to achieve high efficiency, the coreless transformers are used with a full bridge configuration operating at high switching frequencies in the range of 100 MHz to 200 MHz, for example. However, this is has significant drawbacks. These drawbacks include larger switching losses in the power switches being driven at the secondary side due to the high switching frequency. There is larger gate driver losses and larger skin effect losses due to the high switching frequency. Additionally, high voltage devices may not be able to operate at such high switching frequencies due to the lower transit frequency of the high voltage devices. Typical configurations cannot achieve the desired efficiency, such as flyback, full bridge, half bridge, and two inductor and one capacitor (LLC) resonant converter configurations where merely a leakage inductance is used as a resonant component.

Another problem with using coreless transformers is the inability for typical configurations, such as full bridge and LLC resonant converter configurations, to transfer sufficient output current and power at low frequency or charge per cycle. The magnetization inductance is so low that it is difficult to force current to the secondary side without creating a significant AC magnetization current. Thus, the magnetization current swings back and forth with high currents. This creates significant root mean square (rms) current therefore significant conduction losses over the high DC resistance of the primary side.

In order to overcome these drawbacks, a voltage converter is provided with an operating mode that operates the voltage converter at a frequency that increases efficiency of the voltage converter even at maximum load while increasing maximum output power. The voltage converter comprises a switching circuit with a first pair of switches and a second pair of switches. The voltage converter also comprises a capacitor coupled to the switching circuit and to a transformer (e.g., a coreless transformer) of the voltage converter. The maximum efficiency operating point occurs when either the first pair of switches or the second pair of switches are turned off and a voltage of the capacitor at the primary side of the voltage converter reaches an input voltage and an associated conversion ratio of the transformer. This is also a point when a magnetization current approximately reaches a peak value. Thus, the voltage on the capacitor is charged to the input voltage by using the resonance with a magnetized inductance. At turn off of the switches, a drain source capacitance holds switching node voltages while turning off a device. If the discharge of gate voltages is performed before drain source voltages have changed, then a zero voltage turn off can be achieved, which dissipates little to no switching power. The result is that in a first phase after switching off either the first or second pair of switches during a dead time, a significantly larger amount of charge stored in the capacitor starts discharging into the secondary side. After the dead time, the complementary switches are turned on so that charge continues to be delivered to the secondary side with lower losses because the switches are now conducting the current instead of body diodes conducting the current. In some embodiments, a zero voltage turn on of the complementary switches is performed. However, if there is not enough energy in the inductances to completely bring the voltage across the complementary switches to zero. The switching nodes do not swing at this point, which reduces the need to charge and discharge the parasitic capacitances at the switching nodes. The topology of the voltage converter combined with the disclosed operating mode enhances both the efficiency and maximum output power capability of the voltage converter.

FIG. 1 illustrates an embodiment of a voltage converter 100 that is operating according to an operating mode that improves efficiency and output power of the voltage converter 100. The voltage converter 100 comprises a primary side 102 and a secondary side 104. A transformer 127 with primary coils 126 and secondary coils 128 (e.g., primary and secondary windings of a coreless transformer) provides isolation between the primary side 102 (e.g., an input side) and the secondary side 104 (e.g., an output side). The voltage converter 100 is configured to transfer power from the primary side 102 to the secondary side 104 through the transformer 127, such as to provide a bias current for a voltage source 130 at the secondary side 104 based upon a voltage source 118 of the primary side 102. The transformer 127 has a magnetizing inductance and a leakage inductance that are a function of a windings ratio of the transformer 127 (n1 turns of the primary coils 126 to n2 turns of the secondary coils 128).

The voltage converter 100 comprises a switching circuit 108. The switching circuit 108 includes a first pair of switches (Φ1) comprising switch (Φ1) 110 and switch (Φ1) 112. The switching circuit 108 includes a second pair of switches (Φ2) comprising switch (Φ2) 116 and switch (Φ2) 114. The first pair of switches (Φ1) are connected a first switching node with a first switching node voltage (Vsw1) 120. The second pair of switches (Φ2) are connected to a second switching node with a second switching node voltage (Vsw2) 122. The voltage converter 100 comprises a switch control circuit 106 configured to generate a frequency for controlling the first pair of switches (Φ1) and the second pair of switches (Φ2). In some embodiments, the switch control circuit 106 is configured to control the first pair of switches (Φ1) and the second pair of switches (Φ2) according to a plurality of switching events that modify states of the switches (e.g., turning switches on or off) during a plurality of phases of operation of the voltage converter 100. The voltage converter 100 comprises a capacitor 124 (Cfly) that is coupled to the transformer 127 and the switching circuit 108.

In some embodiments of generating the frequency for controlling the first pair of switches (Φ1) and the second pair of switches (Φ2), the frequency is set of a value to control the first pair of switches (Φ1) and the second pair of switches (Φ2) so that a peak capacitor voltage of the capacitor 124 is a factor of an output voltage of the voltage converter 100 and a windings ratio of the transformer 127. In some embodiments, the frequency is set to a value so that the peak capacitor voltage of the capacitor 124 is within a percentage margin of the output voltage of the voltage converter 100 multiplied by the windings ratio of the transformer 127. In some embodiments, the percentage margin is between about 0% and about 20%. In some embodiments, the percentage margin is a positive percentage margin of the factor of the output voltage and the windings ratio. In some embodiments, the percentage margin is a negative percentage margin of the factor of the output voltage and the windings ratio.

In some embodiments, the frequency is set to a value such that a duration of a peak region of a magnitude of a current through the magnetizing inductance of the transformer 127 is approximately a duration of an on-time at least one of the first pair of switches (Φ1) or the second pair of switches (Φ2). In some embodiments, an on-time of the pair of switches is determined by: (pi*sqr((LMag+LLeak)*Cfly)+−45%, wherein LMag is the magnetizing inductance, LLeak is the leakage inductance, and Cfly is a capacitance of the capacitor. In this way, the first pair of switches (Φ1) and the second pair of switches (Φ2) may be controlled with an on-time based upon the resonant frequency of the resonant tank. In some embodiments, an on-time of the first pair of switches (Φ1) is equal to an on-time of the second pair of switches (Φ2).

In some embodiments, the frequency is set such that Vcfly_pk=(Vout*n1/n2)+−X %, where Vcfly_pk is the peak capacitor voltage of the capacitor 124, Vout is the output voltage of the voltage converter 100, n1/n2 is the windings ratio of the transformer 127, and +−X % is the percentage margin of the output voltage of the voltage converter 100 (e.g., X % is between about 0% and about +20% or between about 0% and about −20%). In some embodiments, the frequency is set such that Vcfly_pk=2*(Vout*n1/n2). In some embodiments, the frequency is set such that Vcfly_pk=(Vout*n1/n2)−35%.

In some embodiments, the switching circuit 108 is controlled by the switch control circuit 106 to be in a first state. While in the first state, the voltage source 118 is electrically coupled to the capacitor 124 via the first pair of switches (Φ1) and/or the second pair of switches (Φ2) such that a voltage across the capacitor 124 is a first voltage magnitude. The switching circuit 108 is then controlled by the switch control circuit 106 to be in a second state. While in the second state, the voltage source 118 is electrically coupled to the capacitor 124 via the first pair of switches (Φ1) and/or the second pair of switches (Φ2) such that the voltage across the capacitor 124 is a second voltage magnitude different than the first voltage magnitude. In some embodiments, the voltage source 118 has a voltage magnitude of Vin. While in a steady state, the first voltage magnitude of the voltage across the capacitor 124 is approximately Vin and the second voltage magnitude of the voltage across the capacitor 124 is approximately 2Vin. During a state of the switching circuit 108 between the first state and the second state, the first pair of switches (Φ1) and the second pair of switches (Φ2) are in an open state such that the voltage source 118 is electrically isolated from the capacitor 124. During a state following the second state of the switching circuit 108, the first pair of switches (Φ1) and the second pair of switches (Φ2) are in an open state such that the voltage source 118 is electrically isolated from the capacitor 124.

In some embodiments of performing the switching events, a primary current of the primary coil 126 of the transformer 127 is below a threshold (e.g., 0 or near to 0 during a switching event). In some embodiments, voltages across the first pair of switches (Φ1) and the second pair of switches (Φ2) is below a threshold during a switching event. For example, the switches are switched off at a high current and fast enough so that there is 0V or near to 0V across the switches (e.g., 0V turn on and 0V turn off), resulting in 0 or near 0 power dissipation on the first switching node and the second switching node, which reduces power consumption and increases efficiency.

FIGS. 2A-2H illustrate operation a voltage converter 200 operating in a continuous conduction mode. The voltage converter 200 comprises a primary side 202 and a secondary side 204 that are isolated by a transformer 201 that has primary coils 228 (primary windings) and secondary coils 230 (secondary windings). The voltage converter 200 has a voltage 244 at the secondary side 204 that is based upon a voltage source 210 and input current 208 of the primary side 202. The voltage converter 200 comprises a switching circuit 206 at the primary side 202. The switching circuit 206 comprises a first pair of switches (Φ1) that includes a switch (Φ1) 212 and a switch (Φ1) 214. The switching circuit 206 comprises a second pair of switches (Φ2) that includes a switch (Φ2) 216 and a switch (Φ2) 218. The switching circuit 206 includes a first switching node with a voltage Vsw1 220 and a second switching node with a voltage Vsw2 222. The voltage converter 200 includes a capacitor 224 coupled to the switching circuit 206 and the transformer 201.

Figure 2A:
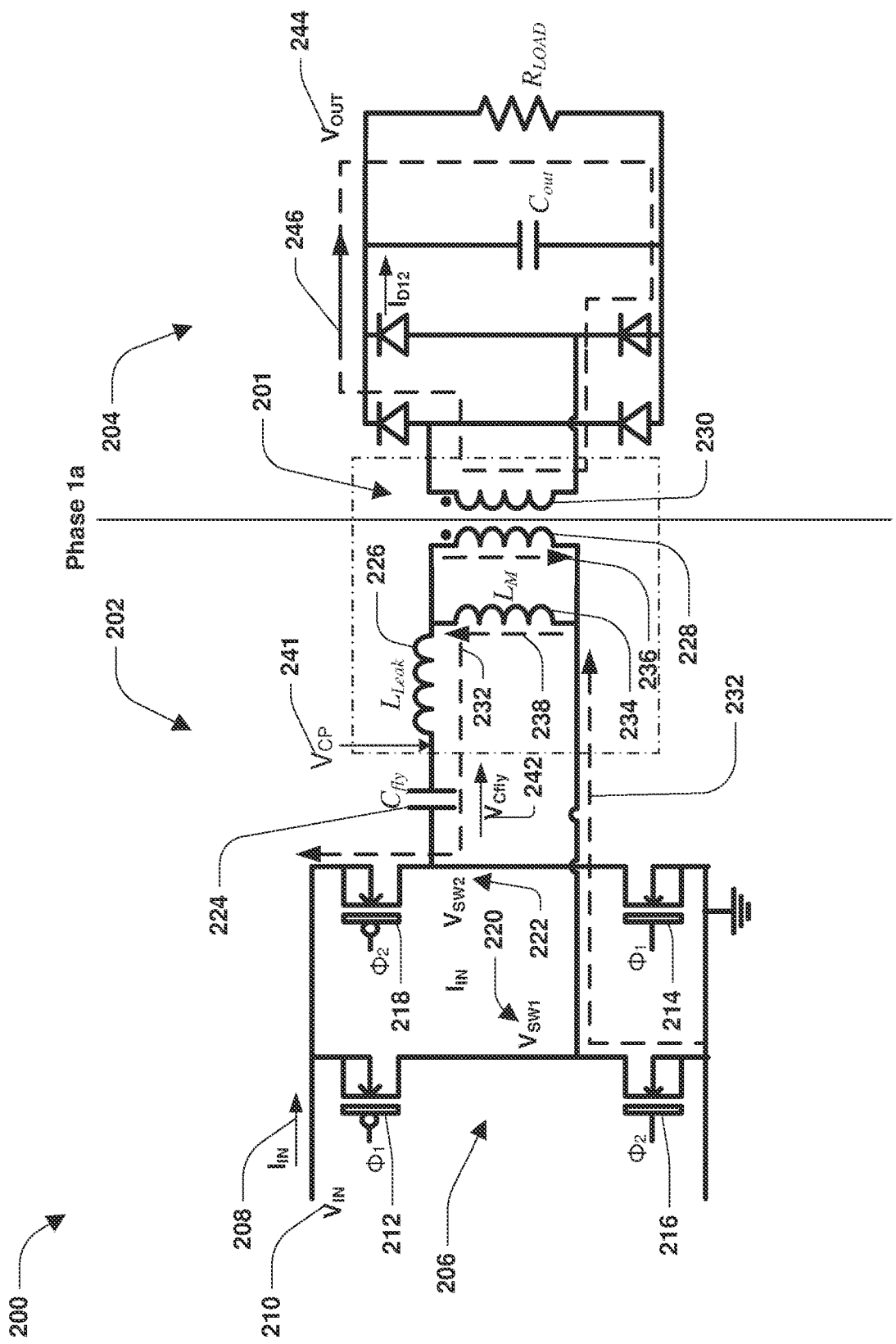
FIGS. 2A-2H are component block diagrams illustrating a voltage converter operating in a continuous conduction mode.

FIG. 2A illustrates a phase 1a of operating the voltage converter 200 in a continuous conduction mode. During the phase 1a, the first pair of switches (Φ1) are on and the second pair of switches (Φ2) are off. The coils of the transformer 201 and the capacitor 224 are charged during phase 1a. The capacitor voltage Vcfly 242 is the voltage across the capacitor 224 and Vcp 241 is a voltage of a Vcp node between the capacitor 224 and ground. When the first pair of switches (Φ1) are on, Vcfly 242 is equal to Vcp 241. When the first pair of switches (Φ1) are turned off, a leakage inductance Lleak 226 and a magnetizing inductance Lm 234 of the transformer 301 are fully charged because a primary coil current 236 through the primary coils 228 is peaking when the capacitor voltage Vcfly 242 across the capacitor 224 peaks. When energy peaks, the switches of the switching circuit 206 are turned off. The leakage inductance Lleak 226 will continue to leak and force current through the voltage converter 200. The switches of the switching circuit 206 are turned off at a high current and fast so that the switches have 0V or close to 0V across the switches and there is 0 or close to 0 power dissipation at the first switching node and/or the second switching node. Once Vsw1 220 of the first switching node has gone low and Vsw2 222 of the second switching node has gone high, then the second pair of switches (Φ2) are turned on. There is a leakage current 232 and a magnetizing inductance current 238. The primary coil current 236 through the primary coils 228 is reflected as current 246 on the secondary side 204 of the voltage converter 200. In some embodiments, the magnetizing inductance current 238 and the leakage current 232 are negative currents that allow for the 0V turn off and on of the switches of the switching circuit 206.

Figure 2B:
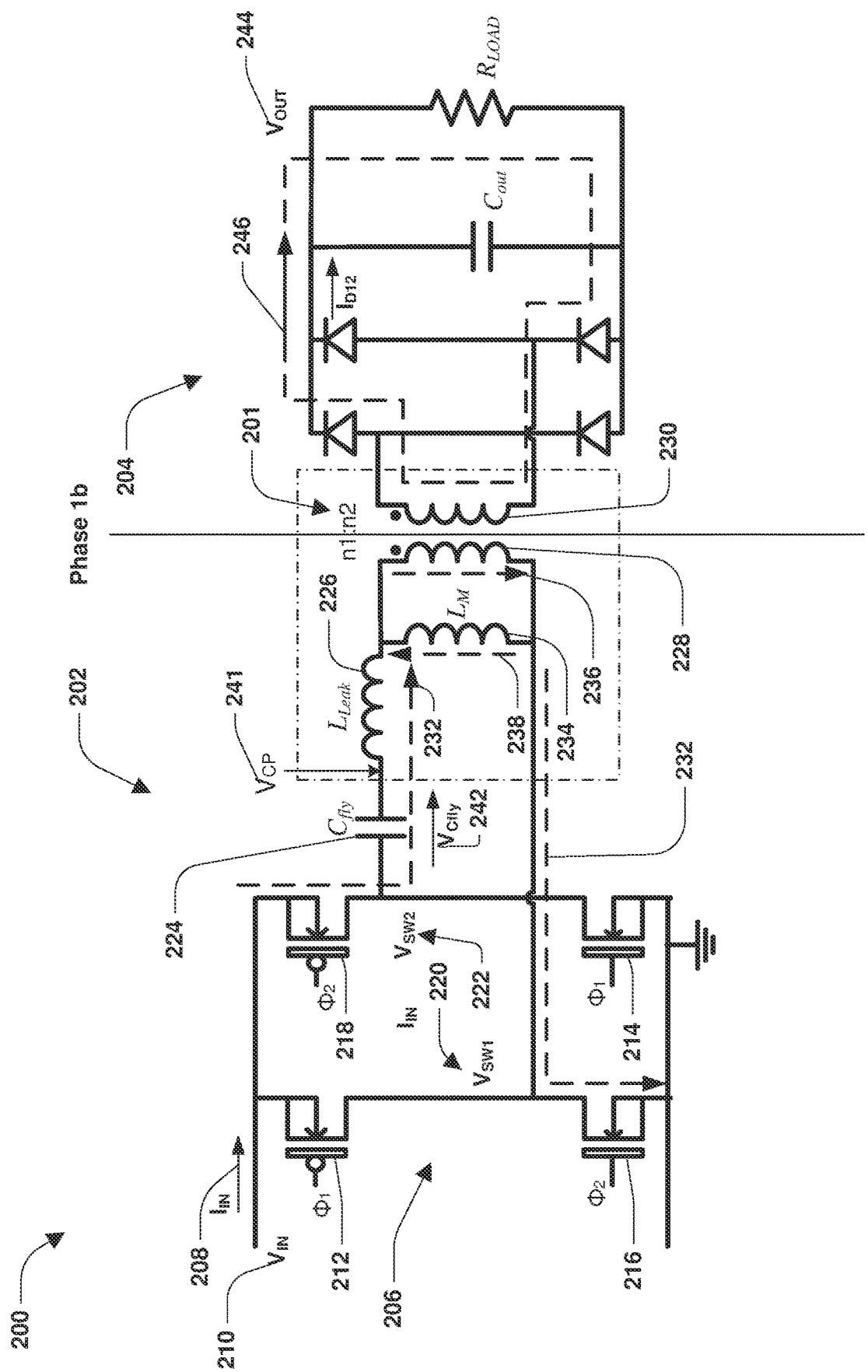

After the phase 1a completes, a phase 1b is performed, which is illustrated by FIG. 2B. During phase 1b, the leakage current 232 reverses direction. The leakage current 232 and the magnetizing inductance current 238 pushes current towards the primary coils 228 of the transformer 201, thus charging the voltage converter 200.

Figure 2C:
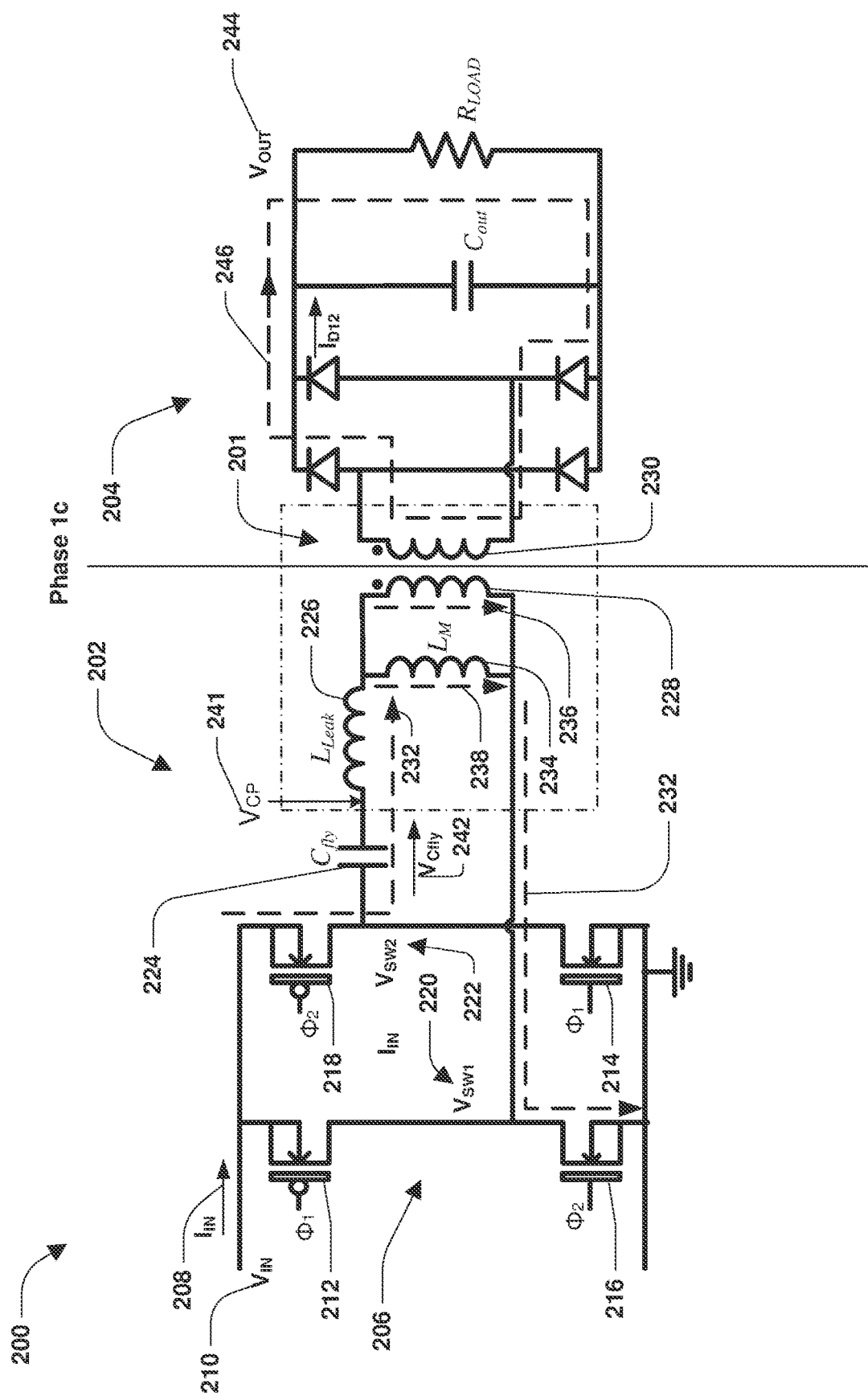

After the phase 1b completes, a phase 1c is performed, which is illustrated by FIG. 2C. During phase 1c, the magnetizing inductance current 238 reverses direction. The primary coil current 236 through the primary coils 228 goes to 0, and thus the magnetizing inductance current 238 is equal to the leakage current 232.

Figure 2D:
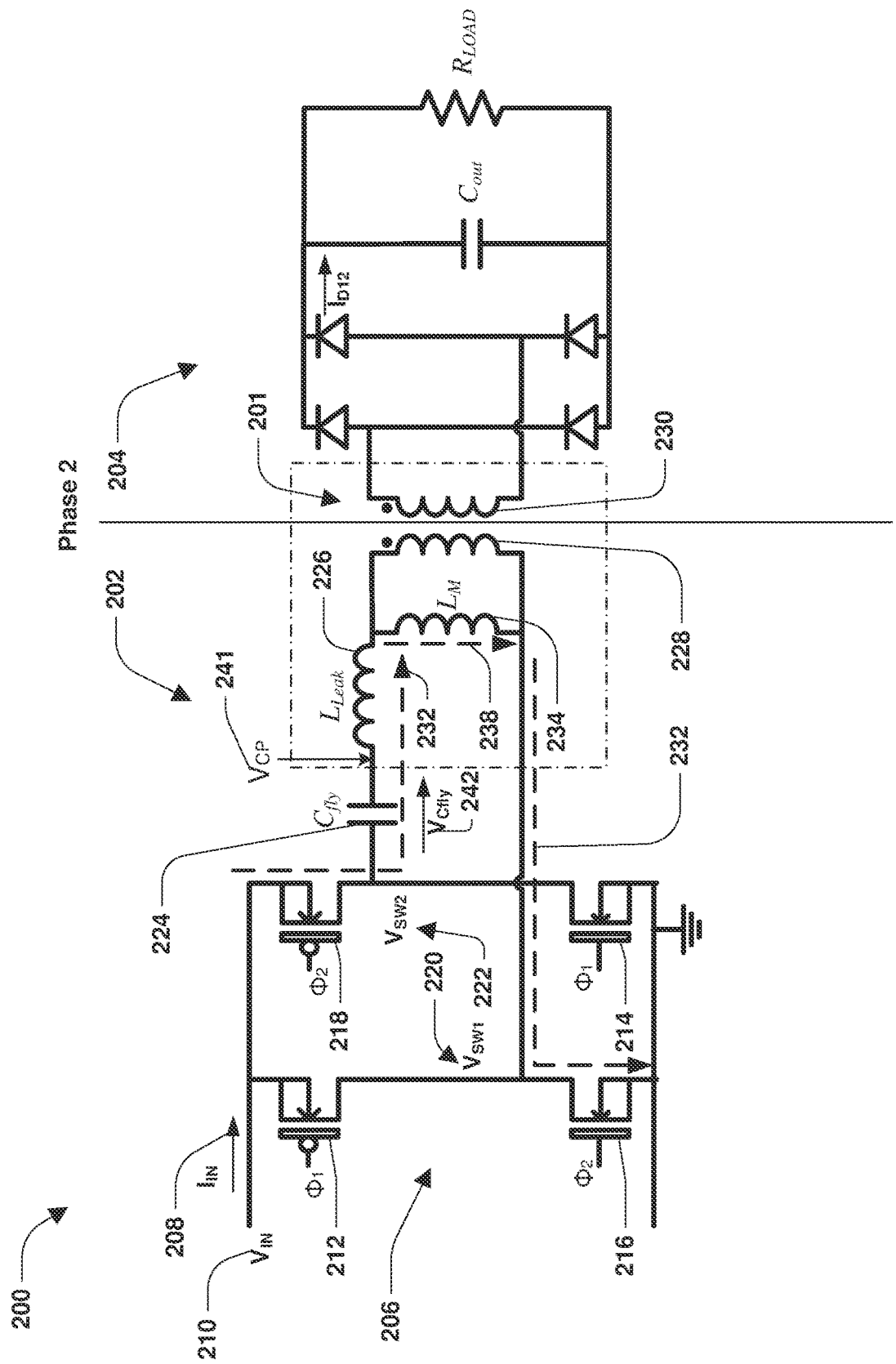

After the phase 1c completes, a phase 2 is performed, which is illustrated by FIG. 2D. During phase 2, the leakage inductance Lleak 226 and the magnetizing inductance Lm 234 are charged, which charges the capacitor 224 in an opposite direction (discharging the capacitor 224 down). This results in Vcfly_pk=(Vout*n1/n2), where Vout is the output voltage of the voltage converter 200, n1/n2 is the windings ratio of the transformer 201, and Vcfly_pk is a peak value of the capacitor voltage Vcfly 242 of the capacitor 224. Accordingly, the voltage converter 200 is operating at peak efficiency. During the phase 2, the second pair of switches (Φ2) are on (closed). At the end of phase 2, the second pair of switches (Φ2) are turned off (opened). The voltage converter 200 is now precharged such that the capacitor voltage Vcfly 242 is precharged to (Vout*n1/n2), and thus there is a maximum magnetizing current at a peak value. Leakage inductance Lleak 226 is pushing Vsw2 222 down and the Vsw1 220 up.

Figure 2E:
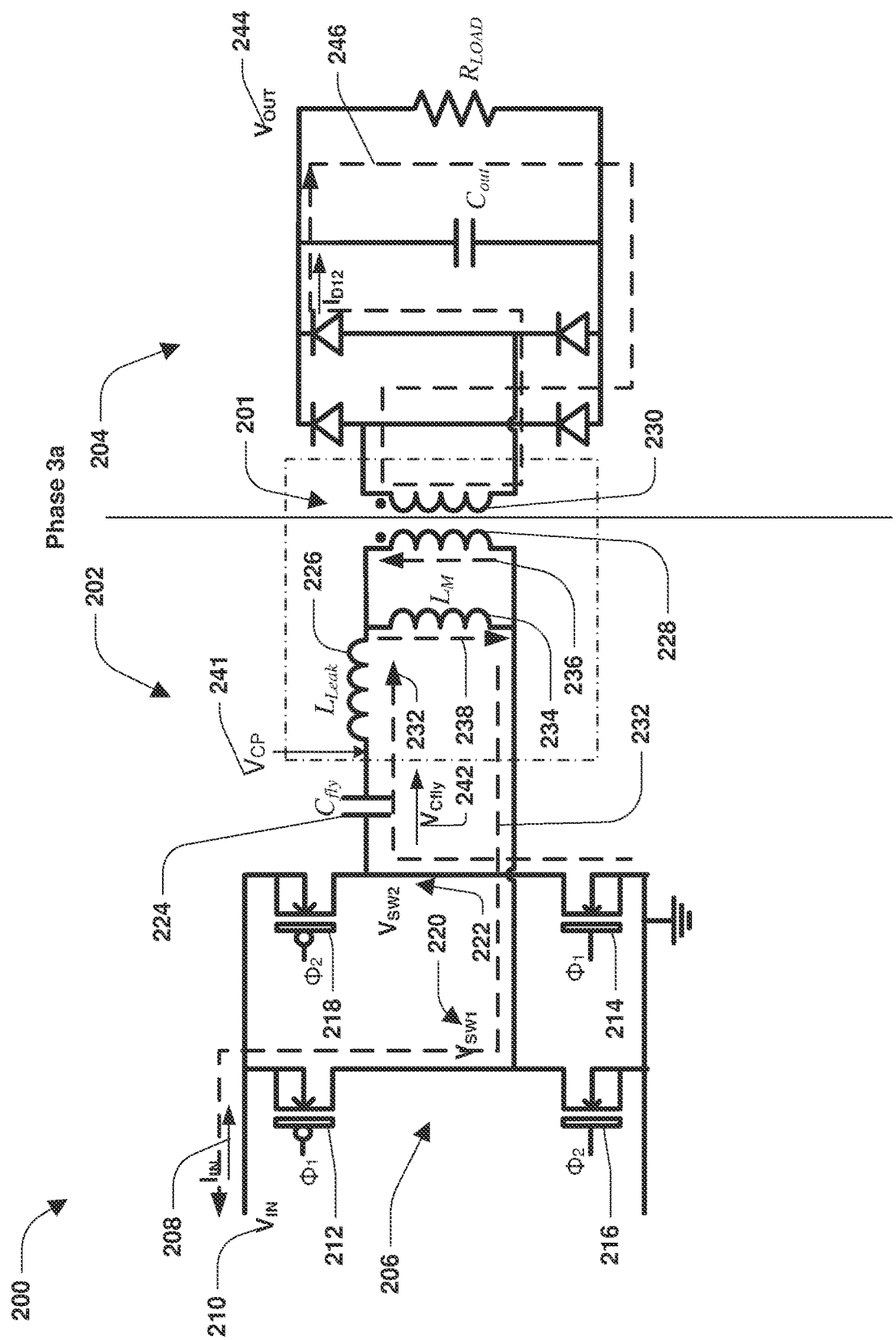

After the phase 2 completes, a phase 3a is performed, which is illustrated by FIG. 2E. During phase 3a, all switches of the switching circuit 206 are off, which may correspond to a dead time. The magnetizing inductance current 238 and the leakage current 232 are in the same direction at peak energy. The leakage inductance Lleak 226 dissipates energy, which then changes direction. The switches of the switching circuit 206 either have current or 0 voltage. The dead time ends at the end of phase 3a.

Figure 2F:
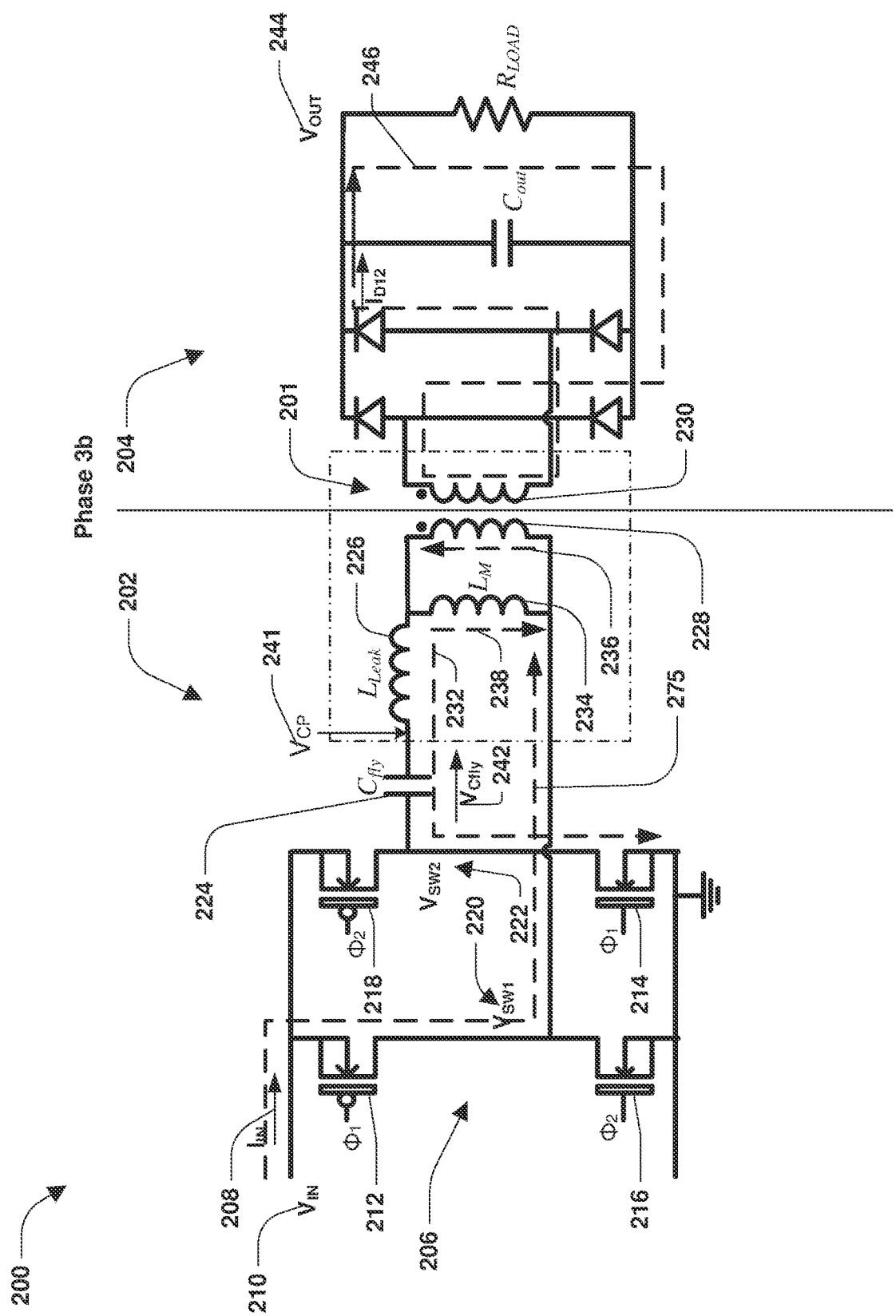

After the phase 3a completes, a phase 3b is performed, which is illustrated by FIG. 2F. During phase 3b, the magnetizing inductance current 238 and current 275 flow towards the primary coils 228 as the primary coil current 236 that is pushed to the secondary side 204 of the voltage converter 200 as current 246. In this way, charge is transferred from the primary side 202 to the secondary side 204 (e.g., a largest amount of charge of the phases).

Figure 2G:
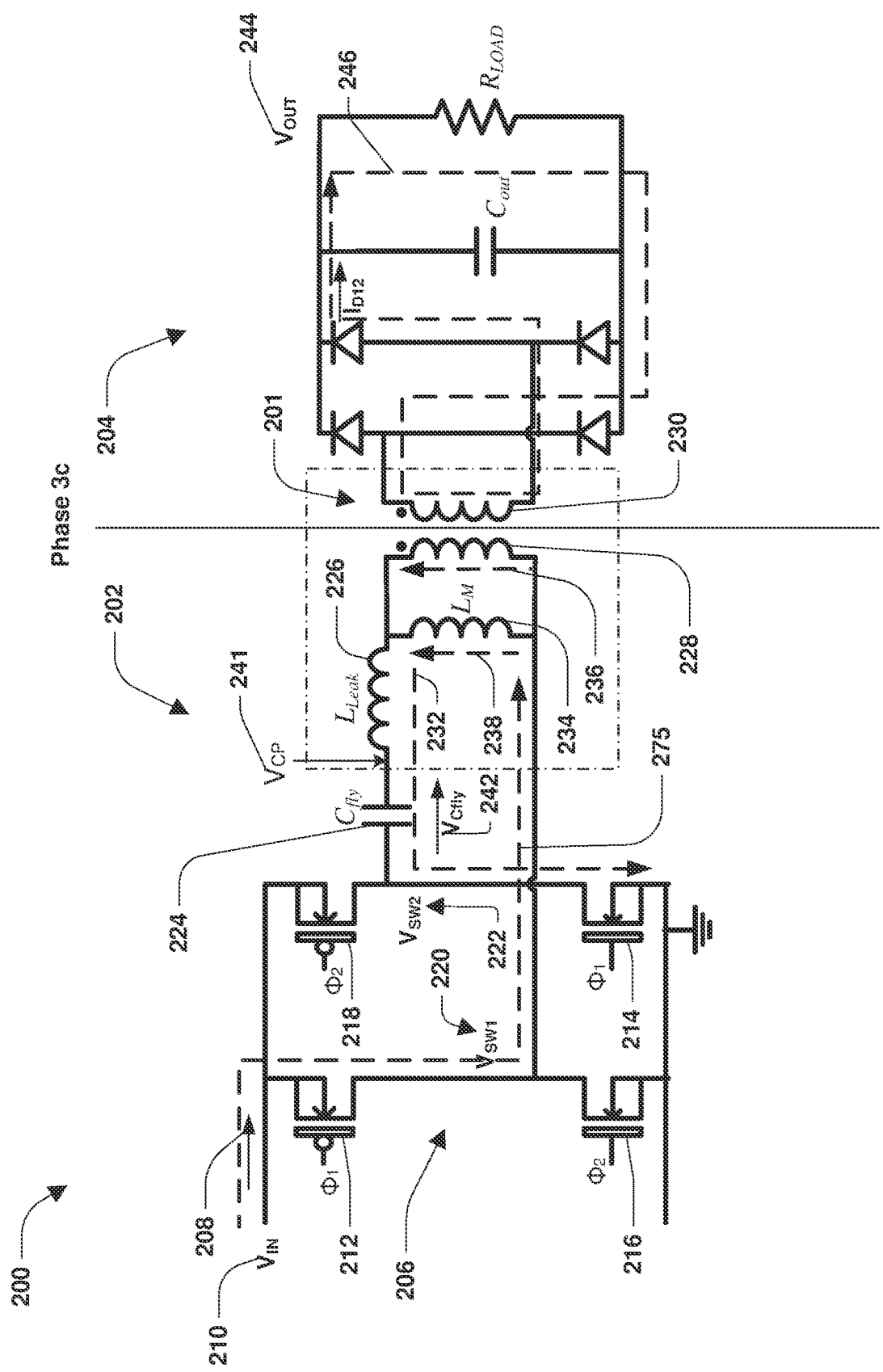

After the phase 3b completes, a phase 3c is performed, which is illustrated by FIG. 2G. During phase 3c, the magnetizing inductance current 238 transitions to 0, and thus the primary coil current 236 becomes 0.

Figure 2H:
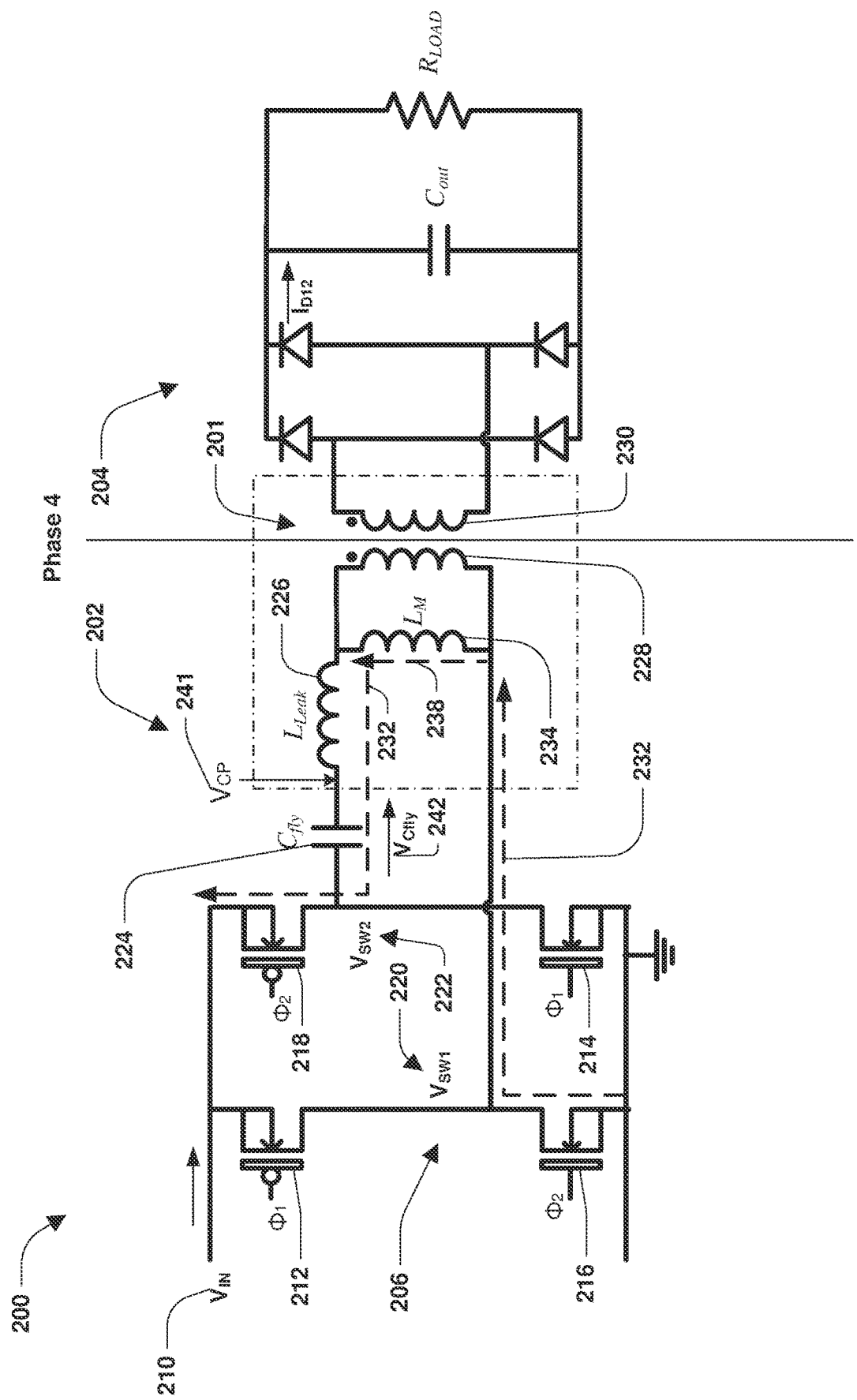

After the phase 3d completes, a phase 4 is performed, which is illustrated by FIG. 2H. Once Vout*n1/n2 reaches a particular voltage, then phase 1a is initiated again.

Figure 2I:
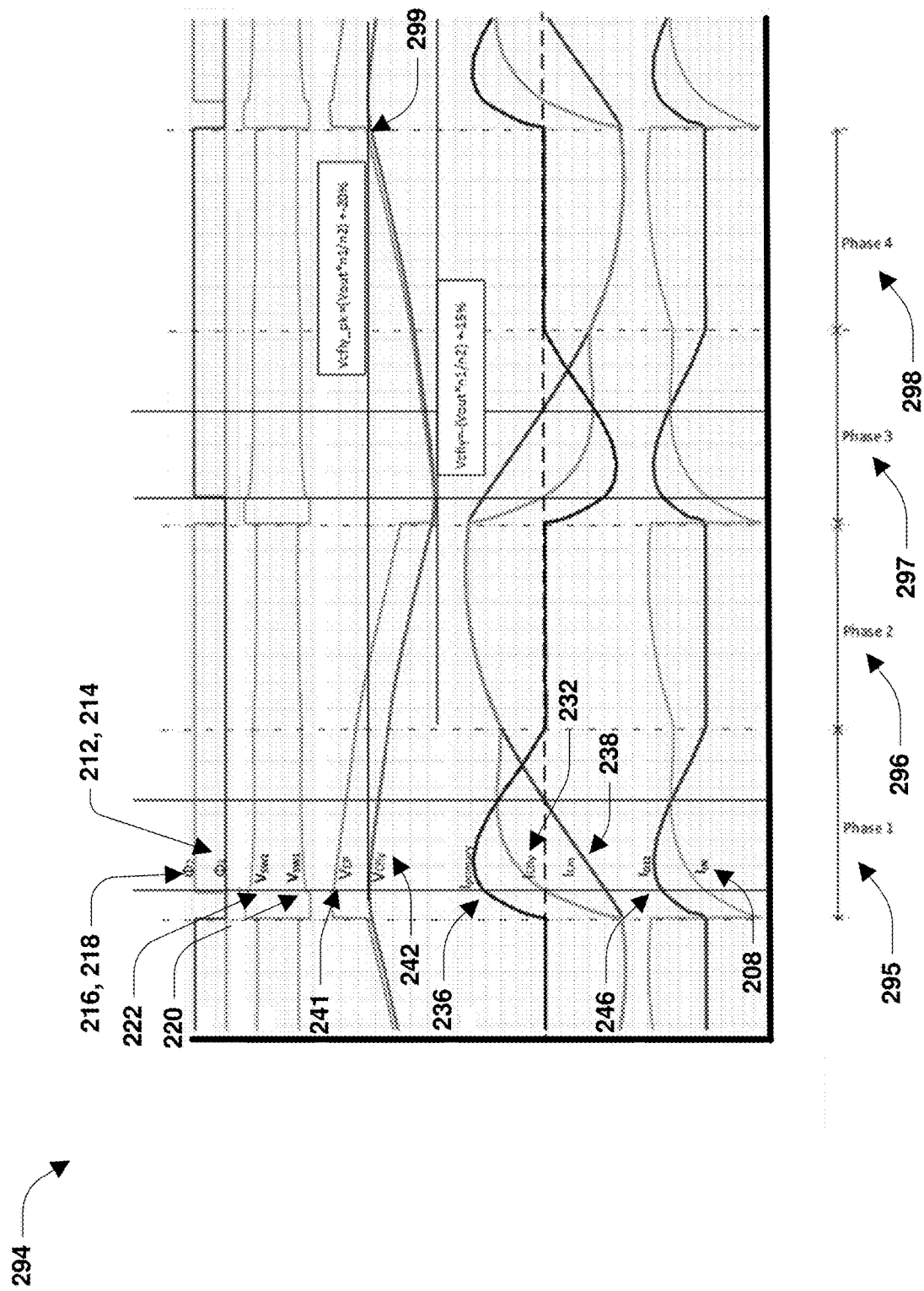
FIG. 2I is a timing diagram of a voltage converter operating in a continuous conduction mode during a plurality of phases.

FIG. 2I illustrates a timing diagram 294 of the voltage converter 200 operating during a first phase 295, a second phase 296, a third phase 297, and a fourth phase 298. The first phase 295 includes the phase 1a, the phase 1b, and the phase 1c illustrated by FIGS. 2A-2C. The second phase 296 is illustrated by FIG. 2D. The third phase 297 includes the phase 3a, the phase 3b, and the phase 3c illustrated by FIGS. 2E-2G. The fourth phase 298 is illustrated by FIG. 2H. The timing diagram 294 illustrates example values of the currents and voltages within the voltage converter 200 during the first phase 295, the second phase 296, the third phase 297, and the fourth phase 298. The first pair of switches (Φ1) and the second pair of switches (Φ2) are operating according to a frequency such that a peak capacitor voltage 299 of the capacitor 224 is Vcfly_pk=(Vout*n1/n2).

FIGS. 3A-3E illustrate operation a voltage converter 300 operating in a discontinuous conduction mode. The voltage converter 300 comprises a primary side 302 and a secondary side 304 that are isolated by a transformer 301 that has primary coils 321 (primary windings) and secondary coils 320 (secondary windings). The voltage converter 300 has an output current 327 at the secondary side 304 based upon an input current 307 of the primary side 202. The voltage converter 300 comprises a switching circuit 306 at the primary side 302. The switching circuit 306 comprises a first pair of switches (Φ1) that includes a switch (Φ1) 308 and a switch (Φ1) 310. The switching circuit 306 comprises a second pair of switches (Φ2) that includes a switch (Φ2) 312 and a switch (Φ2) 314. The switching circuit 306 includes a first switching node with a voltage Vsw1 316 and a second switching node with a voltage Vsw2 318. The voltage converter 300 includes a capacitor 325 coupled to the switching circuit 306 and the transformer 301. The transformer 301 has a leakage inductance Lleak 326 and a magnetizing inductance Lm 323. A resonant tank 324 is formed by a capacitance of the capacitor 325 and a sum of the leakage inductance Lleak 326 and the magnetizing inductance Lm 323. Vcp 322 is a voltage of a Vcp node between the capacitor 325 and ground. The leakage inductance Lleak 326 has a leakage current 330, the magnetizing inductance Lm 323 has a magnetizing inductance current 329, and the primary coils 321 of the transform 301 has a primary coil current 328.

Figure 3A:
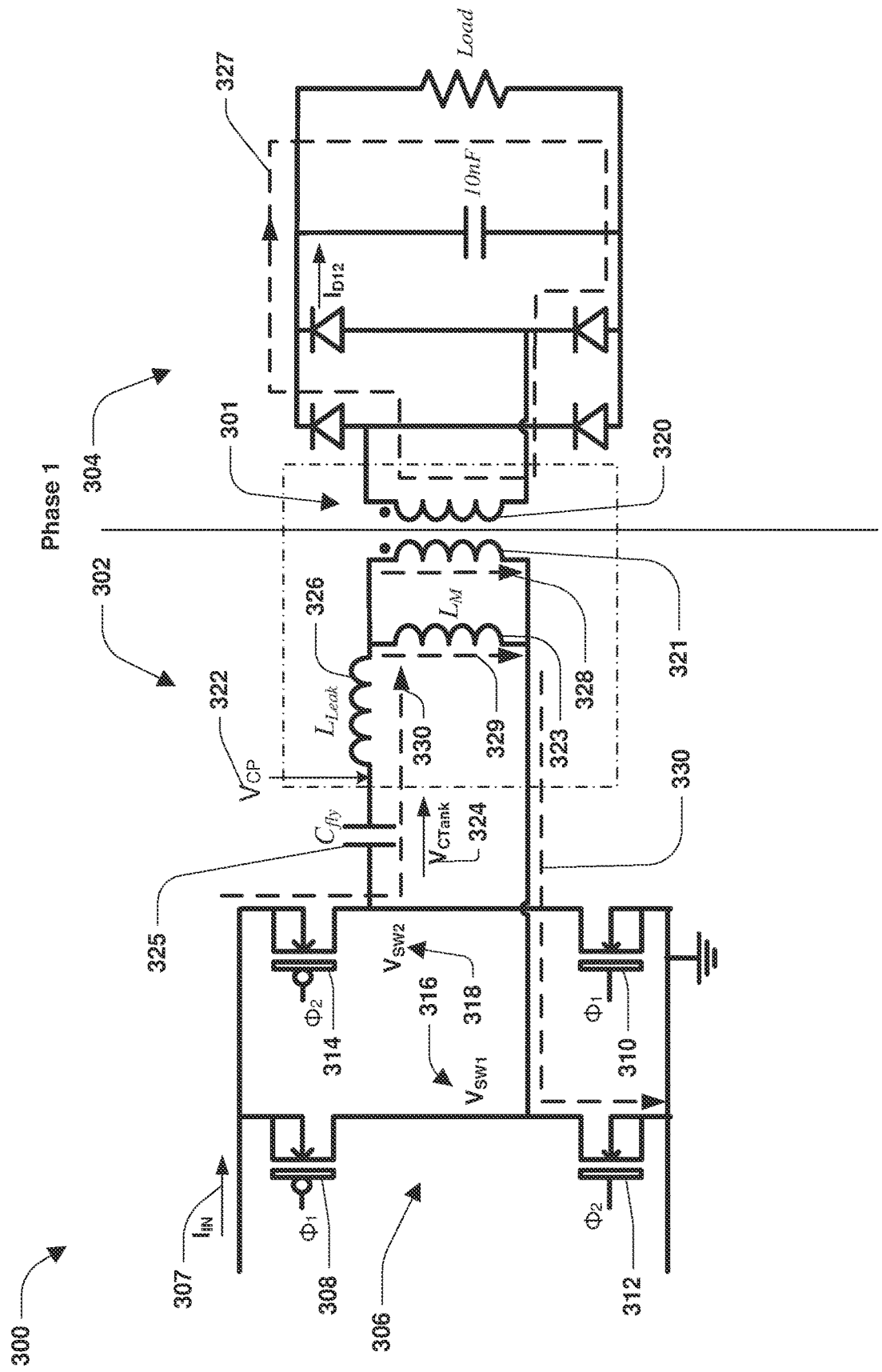
FIGS. 3A-3E are component block diagrams illustrating a voltage converter operating in a discontinuous conduction mode.

FIG. 3A illustrates a phase 1 of operating the voltage converter 300 in the discontinuous conduction mode. During phase 1, the capacitance of the capacitor 3252 is discharging through the leakage inductance Lleak 326 and partially through the magnetizing inductance Lm 323, which injects current into the secondary side 304 of the voltage converter 200 as the current 327. In some embodiments, phase 1 is similar to at least some of phases 1a-1c described in relation to FIGS. 2A-2C.

Figure 3B:
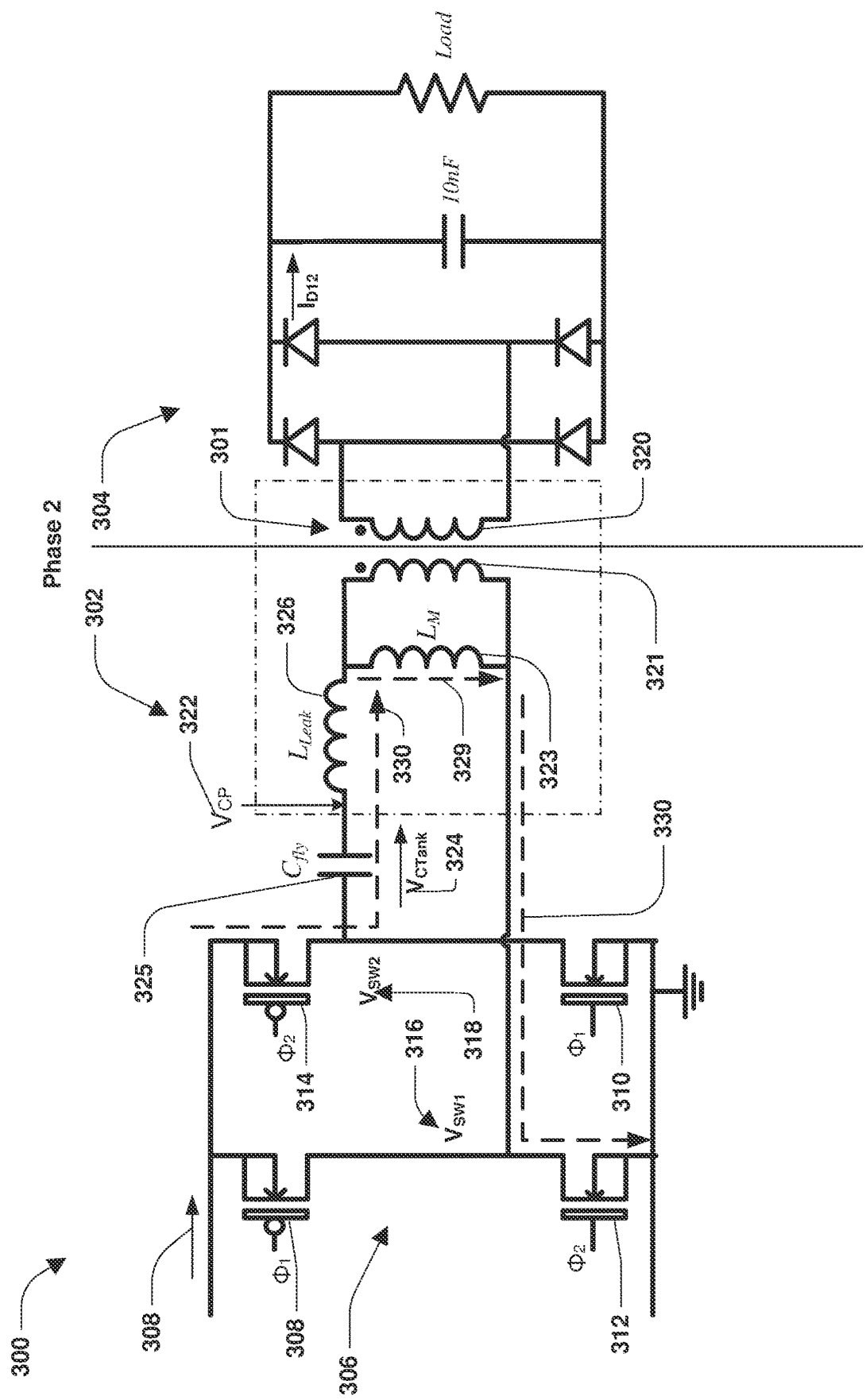

After the phase 1 completes, a phase 2 is performed, which is illustrated by FIG. 3B. During phase 2, the capacitor 325 is charged to a threshold voltage. The primary coils 321 of the transformer 301 are also charged to a peak energy level. Then, the second pair of switches (Φ2) are turned off.

Figure 3C:
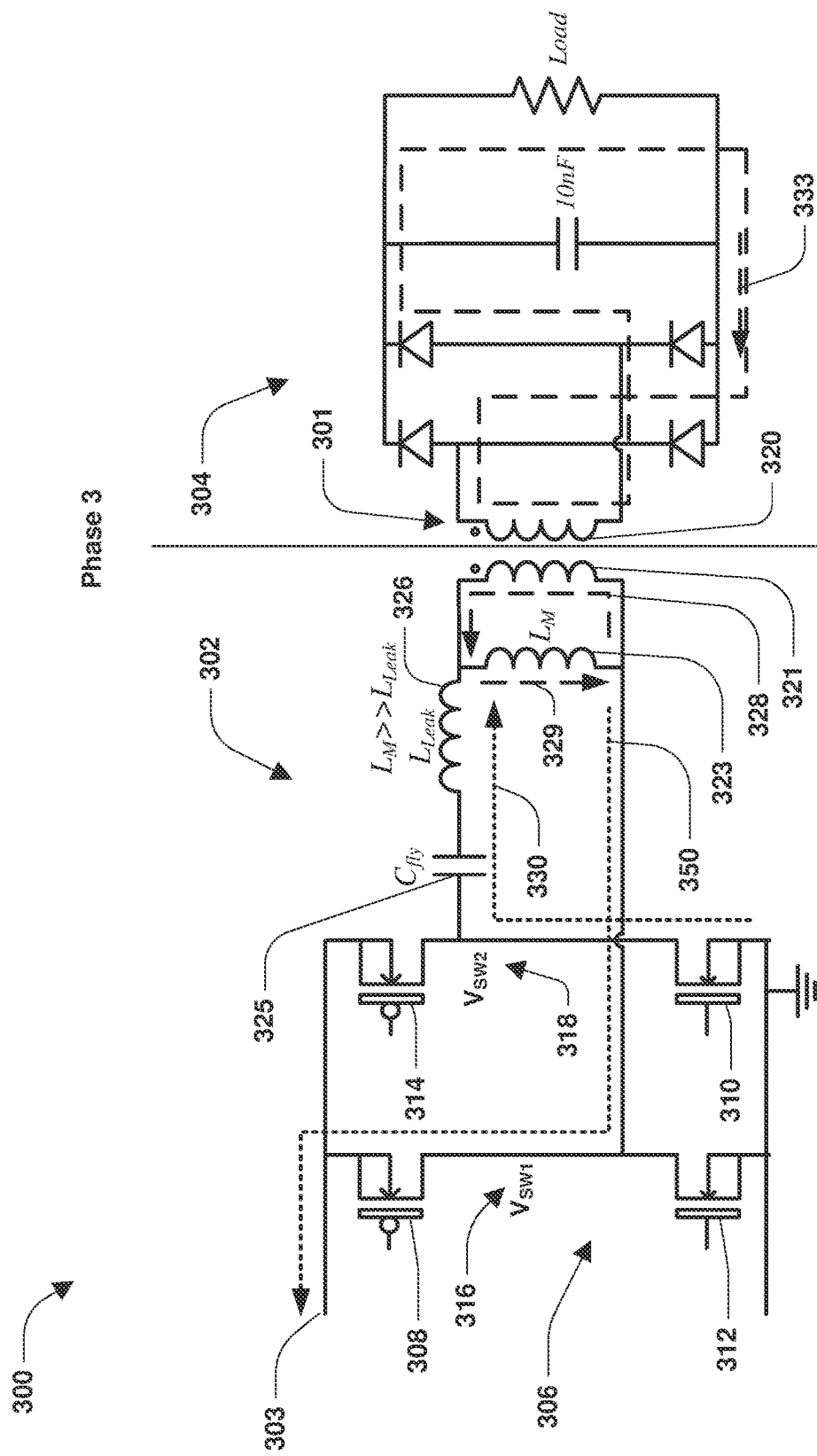

After the phase 2 completes, a phase 3 is performed, which is illustrated by FIG. 3C. During phase 3, leakage inductance Lleak 326 is pushing the leakage current 330, and pushes one of the voltage Vsw1 316 or the voltage Vsw2 318 up, and the other one down. The leakage current 330 is recycled as current 350 back into a supply 303 of the voltage converter 300 and through diodes of the secondary side 304 as current 333. The magnetizing inductance current 329 is pushing energy into the secondary side 304.

Figure 3D:
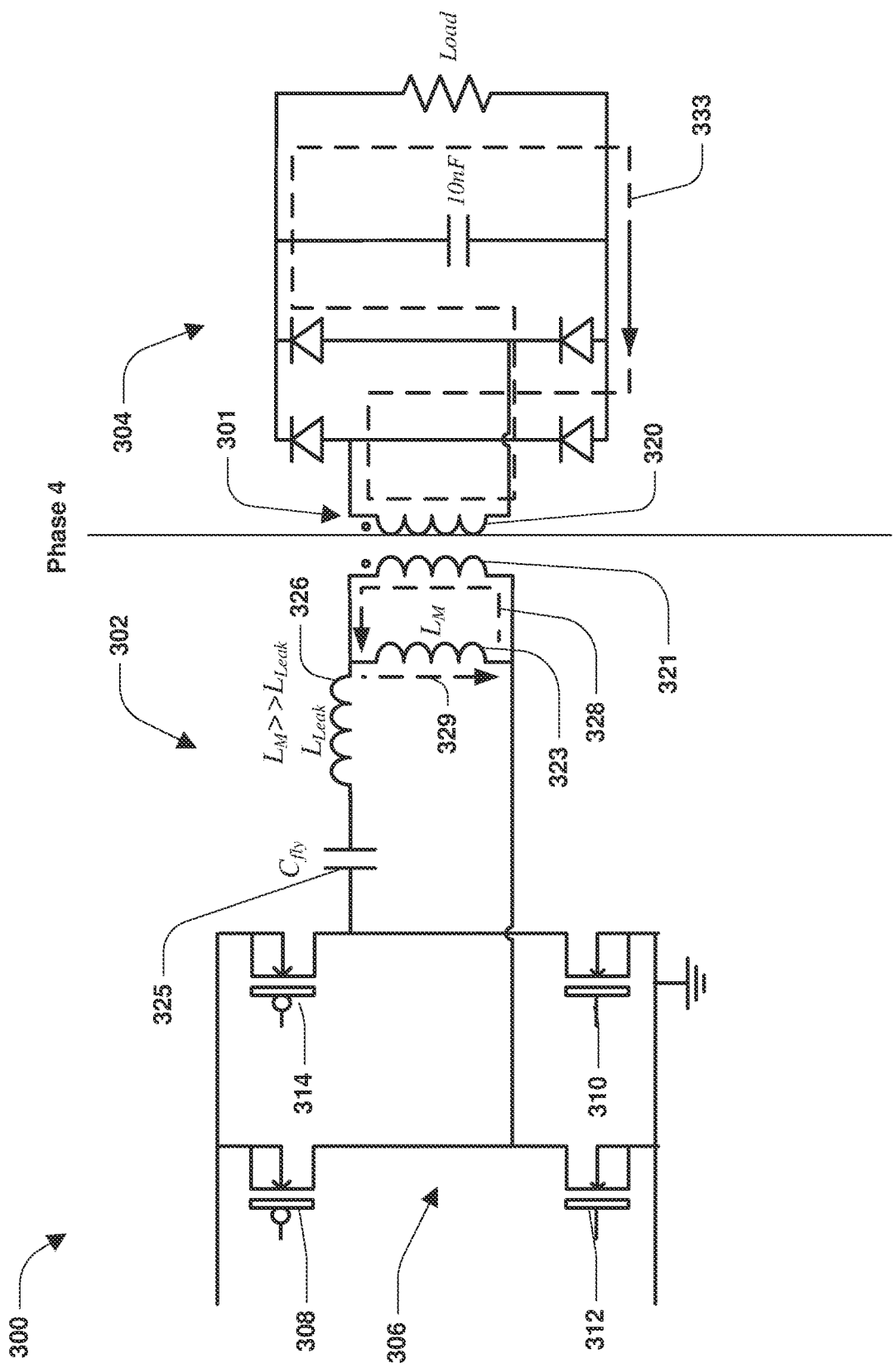

After the phase 3 completes, a phase 4 is performed, which is illustrated by FIG. 3D. During phase 4, leakage inductance Lleak 326 finishes depleting energy, and the magnetizing inductance current 329 continues to deplete into the secondary side 304.

Figure 3E:
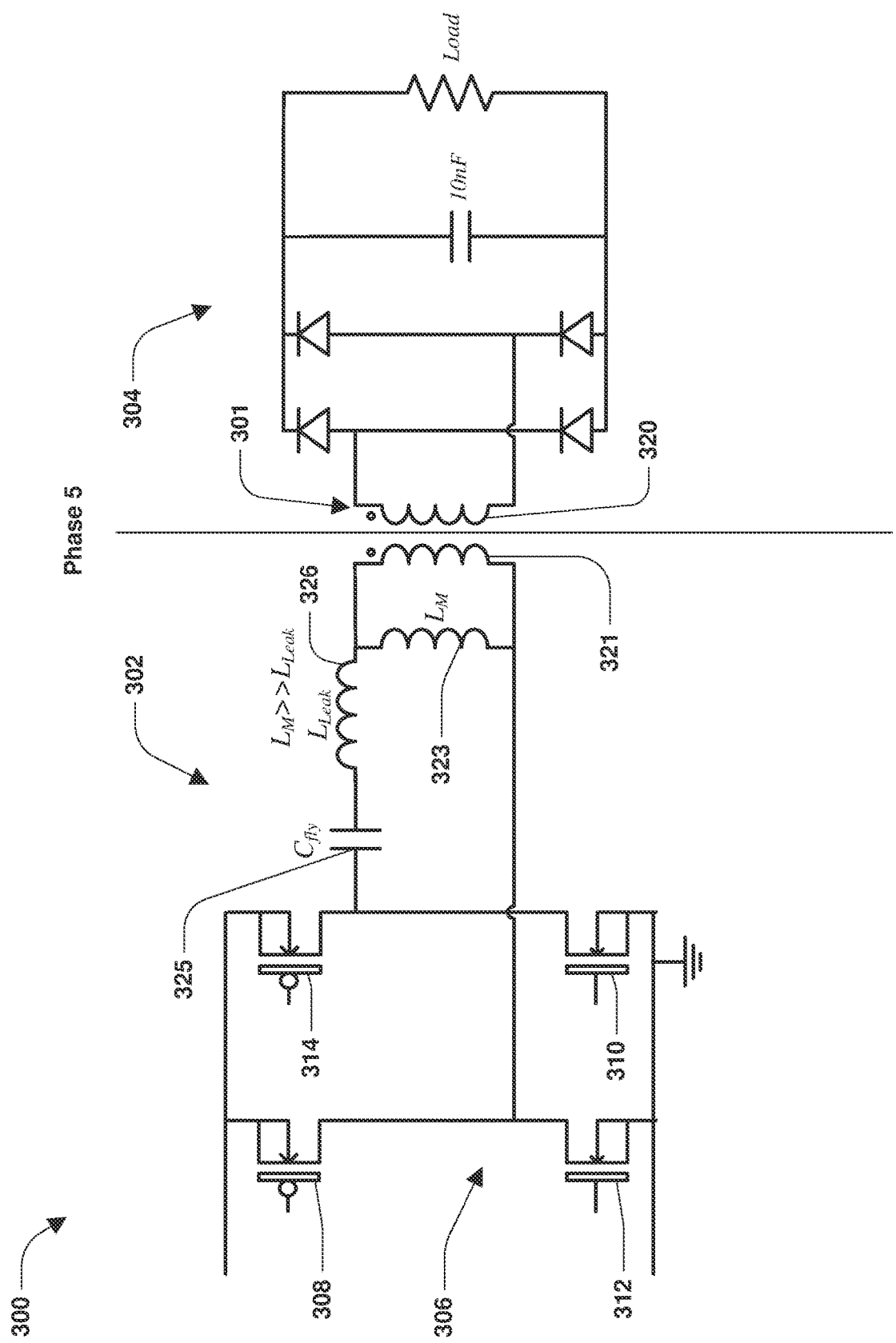

After the phase 4 completes, a phase 5 is performed, which is illustrated by FIG. 3E. During phase 5, all switches of the switching circuit 306 are off. The magnetizing inductance Lm 323 is greater than the leakage inductance Lleak 326. The capacitor 325 is precharged to −Vout*n1/n2. After phase 5, phases 1-5 are repeated by operating the first pair of switches (Φ1) in a similar manner as to how the second pair of switches (Φ2) were operating during the phases 1-5 described in relation to FIGS. 3A-3E.

Figure 3F:
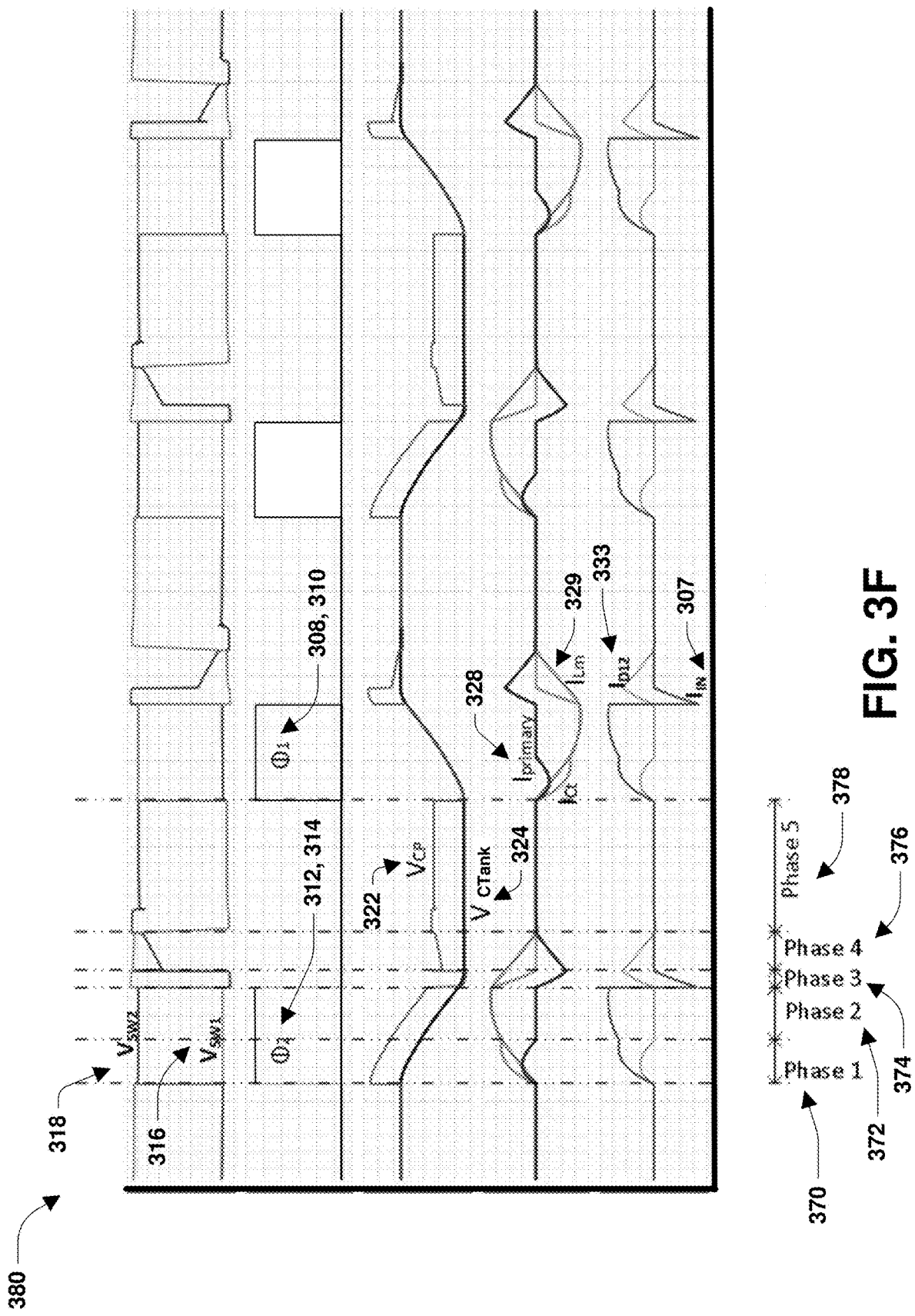
FIG. 3F is a timing diagram of a voltage converter operating in a discontinuous conduction mode during a plurality of phases.

FIG. 3F illustrates a timing diagram 380 of the voltage converter 300 operating during a first phase 370, a second phase 372, a third phase 374, a fourth phase 376, and a fifth phase 378. The first phase 370 is illustrated by FIG. 3A. The second phase 372 is illustrated by FIG. 3B. The third phase 374 is illustrated by FIG. 3C. The fourth phase 376 is illustrated by FIG. 3D. The fifth phase 378 is illustrated by FIG. 3E. The timing diagram 380 illustrates example values of the currents and voltages within the voltage converter 300 during the first phase 370, the second phase 372, the third phase 374, the fourth phase 376, and the fifth phase 378. The first pair of switches (Φ1) and the second pair of switches (Φ2) are operating according to a frequency such that peak capacitor voltage of the capacitor 325 is Vcfly_pk= (Vout*n1/n2).

An embodiment of the presently disclosed subject matter comprises a voltage converter. The voltage converter comprises a switching circuit comprising a first pair of switches and a second pair of switches; a transformer having a magnetizing inductance and a leakage inductance that are a function of a windings ratio of the transformer; a capacitor coupled to the transformer and the switching circuit; and a switch control circuit configured to generate a frequency for controlling the first pair of switches and the second pair of switches, wherein the frequency is set to a value to control the first pair of switches and the second pair of switches so that a peak capacitor voltage of the capacitor is a factor of an output voltage of the voltage converter and the windings ratio of the transformer.

According to some embodiments, the switch control circuit is configured to generate the frequency so that the peak capacitor voltage is within a positive percentage margin of the factor of the output voltage and the windings ratio.

According to some embodiments, the switch control circuit is configured to generate the frequency so that the peak capacitor voltage is within a negative percentage margin of the factor of the output voltage and the windings ratio.

According to some embodiments, the voltage converter comprises a resonant tank formed by a capacitance of the capacitor and a sum of the magnetizing inductance and the leakage inductance.

According to some embodiments, the switch control circuit is configured to control the first pair of switches and the second pair of switches with an on-time based upon a resonant frequency of the resonant tank.

According to some embodiments, a duration of a peak region of a magnitude of a current through the magnetizing inductance of the transformer is approximately a duration of an on-time of at least one of the first pair of switches or the second pair of switches.

According to some embodiments, an on-time of the pair of switches is determined by: (pi*sqr((LMag+LLeak)*Cfly)+−45%, wherein LMag is the magnetizing inductance, LLeak is the leakage inductance, and Cfly is a capacitance of the capacitor.

According to some embodiments, an on-time of the first pair of switches is equal to an on-time of the second pair of switches.

According to some embodiments, the voltage converter is operated according to a continuous conduction mode.

According to some embodiments, the voltage converter is operated according to a discontinuous conduction mode.

According to some embodiments, the voltage converter comprises a voltage source electrically coupled to the switching circuit, wherein: in a first state of the switching circuit, the voltage source is electrically coupled to the capacitor, via the first pair of switches and the second pair of switches, such that a voltage across the capacitor is a first voltage magnitude, and in a second state of the switching circuit, following the first state, the voltage source is electrically coupled to the capacitor, via the first pair of switches and the second pair of switches, such that the voltage across the capacitor is a second voltage magnitude different than the first voltage magnitude.

According to some embodiments, the voltage source has a voltage magnitude of Vin, and in a steady state the first voltage magnitude is approximately Vin and a conversion ratio of the transformer and the second voltage magnitude is approximately 2Vin.

According to some embodiments, during a state of the switching circuit between the first state and the second state, the first pair of switches and the second pair of switches are in an open state such that the voltage source is electrically isolated from the capacitor.

According to some embodiments, during a state of the switching circuit following the second state, the first pair of switches and the second pair of switches are in an open state such that the voltage source is electrically isolated from the capacitor.

According to some embodiments, switching events associated with the first pair of switches and the second pair of switches have a primary current of a primary coil of the transformer.

According to some embodiments, voltages across at least one of the first pair of switches and the second pair of switches is below a threshold during a switching event, wherein a zero voltage turn on is dependent on parasitic values.

An embodiment of the presently disclosed subject matter comprises a voltage converter. The voltage converter comprises a switching circuit comprising a first pair of switches and a second pair of switches; a transformer having a magnetizing inductance and a leakage inductance that are a function of a windings ratio of the transformer; a capacitor coupled to the transformer and the switching circuit; and a switch control circuit configured to generate a frequency for controlling the first pair of switches and the second pair of switches, wherein the frequency is set to a value to control the first pair of switches and the second pair of switches so that a peak capacitor voltage of the capacitor is within a percentage margin of an output voltage of the voltage converter multiplied by the windings ratio of the transformer.

According to some embodiments, the peak capacitor voltage is at least one of:

$$2 * \left(Vout * \frac{n1}{n2}\right),$$

where Vout is the output voltage and n1/n2 is the windings ratio, $$\left(Vout * \frac{n1}{n2}\right) + 100\%,$$

where Vout is the output voltage and n1/n2 is the windings ratio.

An embodiment of the presently disclosed subject matter comprises a voltage converter. The voltage converter comprises a switching circuit comprising a first pair of switches and a second pair of switches; a transformer having a magnetizing inductance and a leakage inductance that are a function of a windings ratio of the transformer; a capacitor coupled to the transformer and the switching circuit; and a switch control circuit configured to generate a frequency for controlling the first pair of switches and the second pair of switches according to a plurality of switching events, wherein the frequency is set to a value to control the first pair of switches and the second pair of switches so that a peak capacitor voltage of the capacitor is within a percentage margin of an output voltage of the voltage converter multiplied by the windings ratio of the transformer, wherein voltages across the first pair of switches and the second pair of switches is approximately zero during the plurality of switching events.

According to some embodiments, the peak capacitor voltage is $$\left(Vout * \frac{n1}{n2}\right) - 35\%,$$

where Vout is the output voltage and n1/n2 is the windings ratio.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A voltage converter, comprising: a switching circuit comprising a first pair of switches and a second pair of switches; a transformer having a magnetizing inductance and a leakage inductance that are a function of a windings ratio of the transformer; a capacitor coupled to the transformer and the switching circuit; and a switch control circuit configured to generate a frequency for controlling the first pair of switches and the second pair of switches, wherein the frequency is set to a value to control the first pair of switches and the second pair of switches so that a peak capacitor voltage of the capacitor is a factor of an output voltage of the voltage converter and the windings ratio of the transformer, wherein an on-time of the pair of switches is determined by: (pi*sqr((LMag+LLeak)*Cfly)+−45%, wherein LMag is the magnetizing inductance, LLeak is the leakage inductance, and Cfly is a capacitance of the capacitor.

2. The voltage converter of claim 1, wherein the switch control circuit is configured to:
  generate the frequency so that the peak capacitor voltage is within a positive percentage margin of the factor of the output voltage and the windings ratio.

3. The voltage converter of claim 1, wherein the switch control circuit is configured to:
  generate the frequency so that the peak capacitor voltage is within a negative percentage margin of the factor of the output voltage and the windings ratio.

4. The voltage converter of claim 1, comprising:
  a resonant tank formed by a capacitance of the capacitor and a sum of the magnetizing inductance and the leakage inductance.

5. The voltage converter of claim 4, wherein the switch control circuit is configured to:
  control the first pair of switches and the second pair of switches with an on-time based upon a resonant frequency of the resonant tank.

6. The voltage converter of claim 1, wherein a duration of a peak region of a magnitude of a current through the magnetizing inductance of the transformer is approximately a duration of an on-time of at least one of the first pair of switches or the second pair of switches.

7. The voltage converter of claim 1, wherein an on-time of the first pair of switches is equal to an on-time of the second pair of switches.

8. The voltage converter of claim 1, wherein the voltage converter is operated according to a continuous conduction mode.

9. The voltage converter of claim 1, wherein the voltage converter is operated according to a discontinuous conduction mode.

10. The voltage converter of claim 1, comprising:
a voltage source electrically coupled to the switching circuit, wherein:
in a first state of the switching circuit, the voltage source is electrically coupled to the capacitor, via the first pair of switches and the second pair of switches, such that a voltage across the capacitor is a first voltage magnitude, and
in a second state of the switching circuit, following the first state, the voltage source is electrically coupled to the capacitor, via the first pair of switches and the second pair of switches, such that the voltage across the capacitor is a second voltage magnitude different than the first voltage magnitude.

11. The voltage converter of claim 10, wherein:
the voltage source has a voltage magnitude of Vin, and
in a steady state the first voltage magnitude is approximately Vin and a conversion ratio of the transformer and the second voltage magnitude is approximately 2Vin.

12. The voltage converter of claim 10, wherein during a state of the switching circuit between the first state and the second state, the first pair of switches and the second pair of switches are in an open state such that the voltage source is electrically isolated from the capacitor.

13. The voltage converter of claim 10, wherein during a state of the switching circuit following the second state, the first pair of switches and the second pair of switches are in an open state such that the voltage source is electrically isolated from the capacitor.

14. The voltage converter of claim 10, wherein switching events associated with the first pair of switches and the second pair of switches have a primary current that is a function of a primary coil of the transformer.

15. The voltage converter of claim 10, wherein voltages across at least one of the first pair of switches and the second pair of switches is below a threshold during a switching event, wherein a zero voltage turn on is dependent on parasitic values.

16. A voltage converter, comprising:
a switching circuit comprising a first pair of switches and a second pair of switches;
a transformer having a magnetizing inductance and a leakage inductance that are a function of a windings ratio of the transformer;
a capacitor coupled to the transformer and the switching circuit; and
a switch control circuit configured to generate a frequency for controlling the first pair of switches and the second pair of switches, wherein the frequency is set to a value to control the first pair of switches and the second pair of switches so that a peak capacitor voltage of the capacitor is within a percentage margin of an output voltage of the voltage converter multiplied by the windings ratio of the transformer, wherein the peak capacitor voltage is at least one of:

$$2*\left(Vout*\frac{n1}{n2}\right),$$

where Vout is the output voltage and n1/n2 is the windings ratio, or $$\left(Vout*\frac{n1}{n2}\right)+100\%,$$

where Vout is the output voltage and n1/n2 is the windings ratio.

17. The voltage converter of claim 16, wherein an on-time of the first pair of switches is equal to an on-time of the second pair of switches.

18. A voltage converter, comprising:
a switching circuit comprising a first pair of switches and a second pair of switches;
a transformer having a magnetizing inductance and a leakage inductance that are a function of a windings ratio of the transformer;
a capacitor coupled to the transformer and the switching circuit; and
a switch control circuit configured to generate a frequency for controlling the first pair of switches and the second pair of switches according to a plurality of switching events, wherein the frequency is set to a value to control the first pair of switches and the second pair of switches so that a peak capacitor voltage of the capacitor is within a percentage margin of an output voltage of the voltage converter multiplied by the windings ratio of the transformer, wherein voltages across the first pair of switches and the second pair of switches is approximately zero during the plurality of switching events, wherein the peak capacitor voltage is $$\left(Vout*\frac{n1}{n2}\right)-M\%,$$

where Vout is the output voltage, M is the percentage margin, and n1/n2 is the windings ratio.

19. The voltage converter of claim 18, wherein the peak capacitor voltage is $$\left(Vout*\frac{n1}{n2}\right)-35\%,$$

where Vout is the output voltage and n1/n2 is the windings ratio.

* * * * *